Oct. 13, 1925.

J. MONTANARO 1,556,798

CHILD'S ROAD ROLLER

Filed May 7, 1925

Inventor
John Montanaro
by Watson E. Coleman
Attorney

Oct. 13, 1925.                    1,556,798
J. MONTANARO
CHILD'S ROAD ROLLER
Filed May 7, 1925                 2 Sheets-Sheet 2
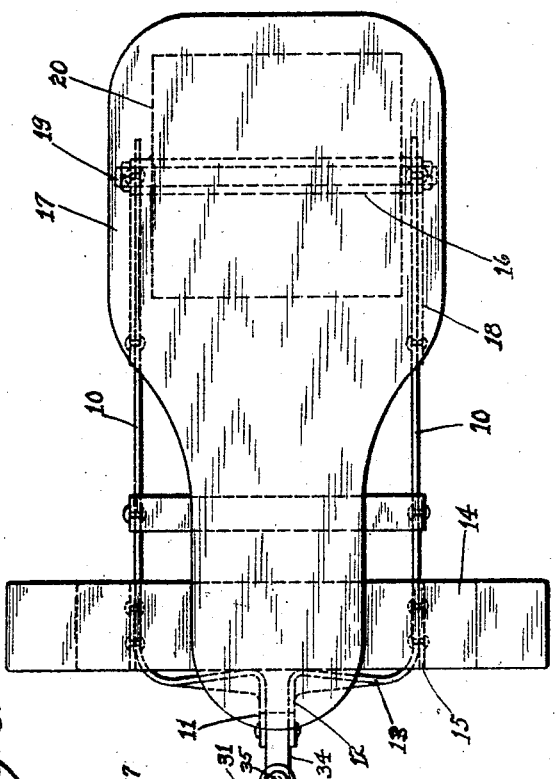
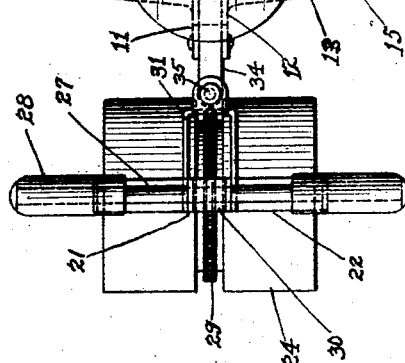
Inventor
John Montanaro
Attorney Patented Oct. 13, 1925.

1,556,798

UNITED STATES PATENT OFFICE.

JOHN MONTANARO, OF PHILADELPHIA, PENNSYLVANIA.

CHILD'S ROAD ROLLER.

Application filed May 7, 1925. Serial No. 28,660.

*To all whom it may concern:*

Be it known that I, JOHN MONTANARO, a citizen of the United States, residing at Philadelphia, in the county of Philadelphia and State of Pennsylvania, have invented certain new and useful Improvements in Children's Road Rollers, of which the following is a specification, reference being had to the accompanying drawings.

This invention relates to push carts such as are used by children, and the general object of the invention is to provide a push cart of a very simple design which will simulate a road roller and may be used by children as a light road roller as well as purely for vehicular purposes.

A further object is to provide a device of this character which is very simple, which may be cheaply made, and which is driven by means of crank handles operatively connected to the front pair of rollers.

Other objects will appear in the course of the following description.

My invention is illustrated in the accompanying drawings, wherein:—

Figure 3 is a top plan view thereof;

Figure 4 is a section on the line 4—4 of Figure 1.

Figures 1, 2:
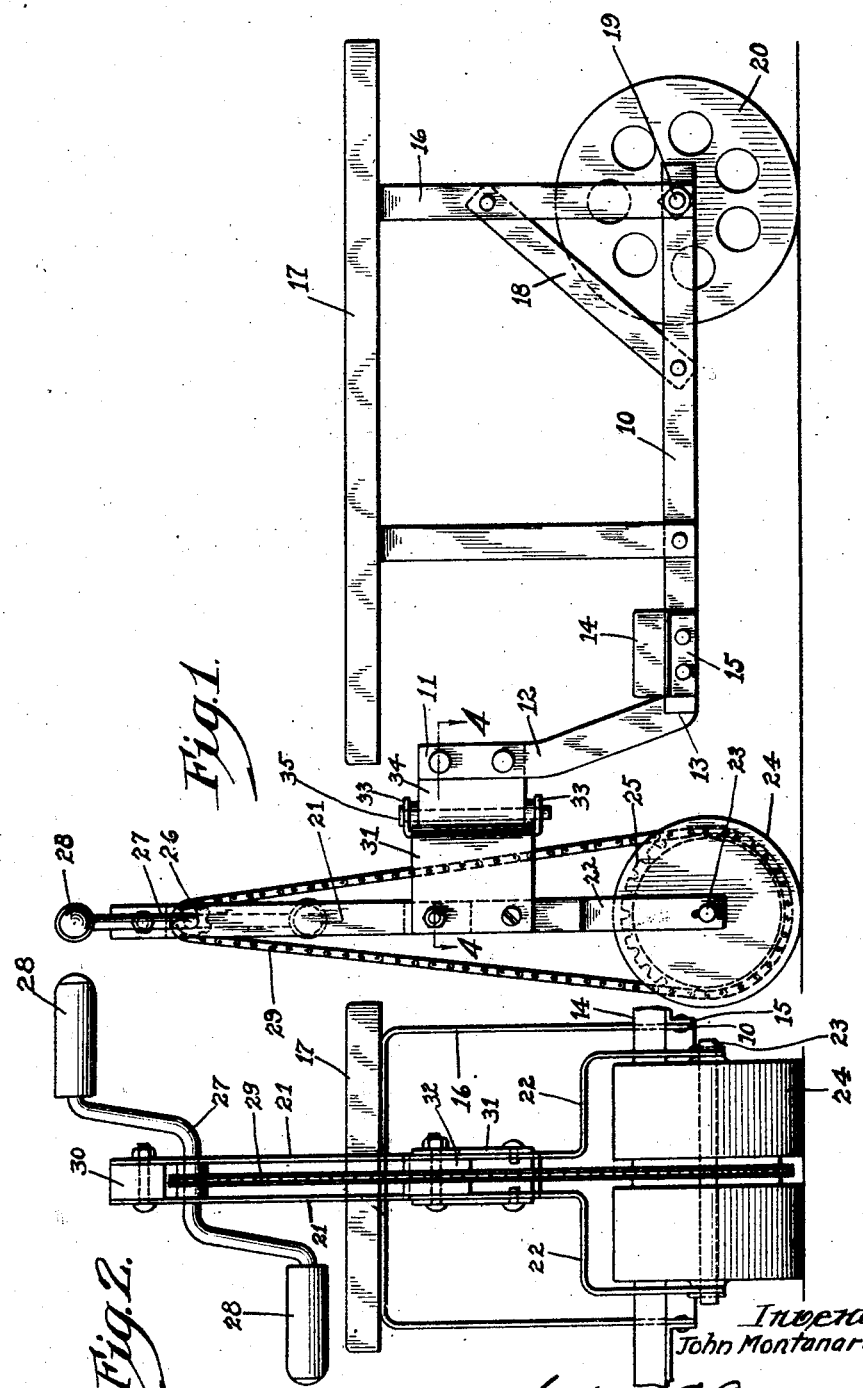
Figure 1 is a side elevation of a push cart or like vehicle constructed in accordance with my invention.
Figure 2 is a front elevation thereof.

Referring to the drawings, it will be seen that the push cart comprises a frame-supporting seat and steering post, as it may be called, and front and rear rollers. The supporting frame of the vehicle rearward of the steering post comprises two longitudinally extending members 10 which may be made of strap iron, angle iron, channel iron or any other suitable material of this character. These irons at their forward ends are angularly bent and extended toward each other and then longitudinally extended, as at 11, and then upwardly extended, as at 12. Attached to the irons just forward of their angular portions 13 is a transversely extending foot rest 14 mounted upon angle irons 15 riveted to the irons 10.

Riveted, bolted or otherwise attached to the longitudinal irons 10 and extending upward therefrom are the front and rear seat supports 16 which carry the longitudinally extending seat 17 of the form best shown in Figure 3. This seat is narrower at its front than at the rear so that the legs of the child may pass down on each side of the front portion of the seat and rest upon the foot rest. The rear uprights are braced by the diagonal braces 18 and the rear end of the members 10 supports a transversely extending axle 19 which carries upon it the roller 20. This roller may be made of any suitable material.

The steering post consists of the two vertically extending irons 21, the lower ends of which are angularly bent outward, as at 22, and then downward and carry the transversely extending axle 23 upon which the roller 24 is mounted. This roller is reduced at its middle, and mounted upon the roller to rotate therewith is a sprocket wheel 25. Carried adjacent the upper ends of the two bars 21 is a small sprocket wheel 26 mounted upon a cranked shaft 27, this cranked shaft having handles 28. Passing over the sprocket wheels 25 and 26 is a sprocket chain 29 so that by rotating the handles 28 power may be connected to the lower roller 24 and thus the device be propelled.

The upper ends of the bars 21 are spaced from each other by a block 30 which is bolted, riveted or otherwise connected to the bars. The steering post formed of the bars 22 is operatively connected to the rear portion of the frame of the vehicle by an approximately U-shaped yoke 31 (shown in Figure 4) which is riveted or bolted to the bars preferably at two points, these bolts passing through a block or blocks 32. The yoke 31 has upper and lower ears 33, and riveted, bolted or otherwise attached to the upper ends of the members 12 is the U-shaped yoke 34. A pintle 35 or hinge pin passes through the ears and pivotally connects the steering post to the rear frame of the vehicle.

The use of this device will be obvious. The child rests upon the seat, placing his feet upon the foot rest, and with his hands operates the crank to thereby drive the miniature roller forward. The rollers may be made hollow and light and thus the device be used purely as a toy vehicle, or the rollers may be made relatively heavy and the child actually use the device as a light roller such as might be used on lawns, garden paths, etc.

I claim:—

1. A toy vehicle of the character described simulating a road roller and having a supporting frame and seat thereon, a rear roller upon which the rear end of the supporting frame is mounted, a front steering post pivotally connected to the supporting frame, a front roller carried by the steering post, and manually operable means carried by the steering post whereby the front roller may be driven.

2. A toy vehicle simulating a road roller comprising a supporting frame, a seat thereon, a rear axle carried on the supporting frame, a rear roller mounted on the axle, a steering post, means hingedly connecting the steering post to the forward end of the supporting frame, a front roller mounted upon the lower end of the steering post and including a sprocket wheel, a crank shaft passing through the upper end of the steering post and carrying a sprocket wheel, and a sprocket chain connecting the two sprocket wheels.

3. A toy vehicle simulating a road roller and including a supporting frame, a rear roller carried at the rear end of the supporting frame, a seat mounted upon the supporting frame, the forward end of the supporting frame extending upward and forward and carrying a U-shaped yoke, a steering post composed of spaced members flared at their lower ends, a front roller disposed between the flared lower ends of the spaced members, the middle of the front roller being reduced in diameter, a sprocket wheel mounted on this reduced portion, a sprocket wheel mounted between the upper ends of said members, a crank shaft having handles extending through the members and supporting said last named sprocket wheel, and a sprocket chain engaging the sprocket wheels.

4. A toy vehicle of the character described simulating a road roller and comprising a rear supporting frame, a rear roller carried thereby, a seat carried thereby above the rear roller, a foot rest attached to the supporting frame below the forward end of the seat and extending transversely of the supporting frame and beyond the same and the seat, a vertically extending steering post comprising two spaced members, a yoke attached to the steering post and extending rearward therefrom and having a pair of ears, a pintle bolt passing through the ears, a yoke attached to the forward end of the supporting frame and through which the pintle bolt passes, a forward roller carried by said bars of the steering post and having a reduced middle portion, a sprocket wheel mounted therein, a sprocket wheel mounted between said bars at the rear ends thereof, a sprocket chain passing around the sprocket wheels, and a crank shaft supporting the upper sprocket wheel and having operating handles.

In testimony whereof I hereunto affix my signature.

JOHN MONTANARO.